United States Patent
Xie et al.

(10) Patent No.: US 10,813,135 B2
(45) Date of Patent: Oct. 20, 2020

(54) RANDOM ACCESS METHOD AND APPARATUS

(71) Applicant: ZTE CORPORATION, Guangdong (CN)

(72) Inventors: Yutang Xie, Guangdong (CN); Hui Xu, Guangdong (CN); Suxia Guo, Guangdong (CN); Ronghui Hou, Guangdong (CN)

(73) Assignee: ZTE Corporation, Guangdong (CN)

( * ) Notice: Subject to any disclaimer, the term of this patent is extended or adjusted under 35 U.S.C. 154(b) by 93 days.

(21) Appl. No.: 16/097,370

(22) PCT Filed: Apr. 5, 2016

(86) PCT No.: PCT/CN2016/078470
§ 371 (c)(1),
(2) Date: Oct. 29, 2018

(87) PCT Pub. No.: WO2017/084236
PCT Pub. Date: May 26, 2017

(65) Prior Publication Data
US 2020/0077443 A1    Mar. 5, 2020

(30) Foreign Application Priority Data
Nov. 20, 2015 (CN) .......................... 2015 1 0811773

(51) Int. Cl.
*H04W 74/08* (2009.01)
*H04W 76/27* (2018.01)
(Continued)

(52) U.S. Cl.
CPC ....... *H04W 74/0833* (2013.01); *H04W 8/005* (2013.01); *H04W 76/10* (2018.02); *H04W 76/27* (2018.02)

(58) Field of Classification Search
CPC . H04W 74/0833; H04W 8/005; H04W 76/27; H04W 76/10; H04W 8/26; H04W 88/04; H04W 84/20
See application file for complete search history.

(56) References Cited

U.S. PATENT DOCUMENTS

| 2010/0278064 A1 | 11/2010 | Jeong |
| 2011/0268006 A1 | 11/2011 | Koskela et al. |

(Continued)

FOREIGN PATENT DOCUMENTS

| CN | 102422568 A | 4/2012 |
| CN | 102811496 A | 12/2012 |

(Continued)

OTHER PUBLICATIONS

International Search Report dated Aug. 25, 2016 for International Application No. PCT/CN2016/078470, 7 pages.

(Continued)

*Primary Examiner* — Hoang-Chuong Q Vu
(74) *Attorney, Agent, or Firm* — Knobbe, Martens, Olson & Bear, LLP

(57) ABSTRACT

Provided are a random access method and apparatus. The method can include: a first cluster head in a first cluster formed by multiple UEs selects a preamble from a preset preamble set, and transmits the preamble to a base station, each preamble in the preamble set indicating the number of UEs corresponding to the each preamble, and the number of UEs corresponding to the selected preamble being equal to the number of cluster members in the first cluster; the first cluster head receives a response message transmitted by the base station in response to the preamble; and the first cluster head broadcasts, to each cluster member in the first cluster, the resource information for establishing the RRC connection and the C-RNTI.

16 Claims, 7 Drawing Sheets

(51) Int. Cl.
*H04W 76/10* (2018.01)
*H04W 8/00* (2009.01)

(56) References Cited

U.S. PATENT DOCUMENTS

| | | | | |
|---|---|---|---|---|
| 2013/0170479 A1* | 7/2013 | Fong | ............... | H04W 74/085 |
| | | | | 370/336 |
| 2014/0079011 A1* | 3/2014 | Wiberg | ............... | H04W 74/006 |
| | | | | 370/329 |
| 2014/0307611 A1 | 10/2014 | Tesanovic | | |
| 2015/0016385 A1 | 1/2015 | Aiba | | |
| 2015/0236932 A1* | 8/2015 | Yu | ............... | H04W 24/08 |
| | | | | 370/252 |
| 2015/0289080 A1 | 10/2015 | Wu | | |
| 2015/0365157 A1* | 12/2015 | Yang | ............... | H04B 7/0811 |
| | | | | 370/329 |
| 2016/0134436 A1* | 5/2016 | Yu | ............... | H04L 12/6418 |
| | | | | 370/337 |
| 2016/0192399 A1* | 6/2016 | Zhu | ............... | H04W 36/0022 |
| | | | | 370/331 |
| 2016/0373559 A1* | 12/2016 | Nabetani | ............... | H04L 1/16 |
| 2017/0064736 A1* | 3/2017 | Yu | ............... | H04W 76/14 |
| 2017/0311217 A1* | 10/2017 | Jung | ............... | H04W 36/04 |
| 2018/0077676 A1* | 3/2018 | Kaloxylos | ............... | H04W 84/005 |
| 2019/0261322 A1* | 8/2019 | Xu | ............... | H04L 1/1812 |

FOREIGN PATENT DOCUMENTS

| | | |
|---|---|---|
| CN | 103796312 A | 5/2014 |
| CN | 104105103 A | 10/2014 |
| WO | 2013125919 A1 | 8/2013 |

OTHER PUBLICATIONS

Written Opinion of the International Searching Authority dated Aug. 25, 2016 for International Application No. PCT/CN2016/078470, 9 pages.

Wang, et al., "Random Access Design for Clustered Wireless Machine to Machine Networks", First International Black Sea Conference on Communications and Networking (BLOCKSEACOM), Dec. 31, 2013, the thesis, sections II and III.

* cited by examiner

RANDOM ACCESS METHOD AND APPARATUS

CROSS REFERENCE TO RELATED APPLICATIONS

This is a National Stage Application, filed under 35 U.S.C. 371, of International Patent Application No. PCT/CN2016/078470, filed on Apr. 5, 2016, which claims priority to Chinese patent application No. 201510811773.2 filed on Nov. 20, 2015, entire disclosure of each of which is incorporated herein by reference.

TECHNICAL FIELD

The present disclosure relates to the field of communication and, in particular, to a random access method and apparatus.

BACKGROUND

The rapid development of a wireless communication technology has made it possible for vehicles moving at a high speed to download data (such as news or entertainment data) from a roadside unit (RSU). However, due to the high moving speed of vehicles, the small coverage of the RSU and the large volume of the data, it is difficult for a vehicle to complete the download task alone. In the related art, in order to resolve the problem, a cluster-based competition download method is adopted. When a vehicle (cluster head) needs to download data, the vehicle first requests the surrounding vehicles to form a cluster with the vehicle; then cluster members separately download part of data from the RSU; finally, by way of a D2D communications technology, the cluster members transmit data to the cluster head.

FIG. 1 is a flowchart of a D2D discovery process in the related art. As shown in FIG. 1, Model B of the D2D discovery technology supported by the current 3GPP is used for forming a cluster. In this model, users participating in the discovery process may be divided into two categories: a discoverer user equipment (UE) and a discoveree UE. The discoverer UE transmits discovery request information to declare competition that the user is interested in. The discoveree UE replies to the request information of the discoverer after receiving the request information.

When the cluster head requests data transmission resources, the cluster head first performs a random access process to establish a wireless connection with a base station. The random access process includes the following four different messages: a random access preamble, a random access response, an RRC connection request and RRC competition resolution. FIG. 2 is a schematic view of a random access channel (RACH) process in the related art. As shown in FIG. 2, the process of the random access channel (RACH) may include the steps described below.

In S102, the cluster head selects a random preamble from a group of available preambles, and randomly selects a channel to transmit the preamble. The preamble has four different formats, which are respectively applied to different scenarios, and the differences mainly lie in random connection duration, cell coverage and UE moving speed.

In S104, a base station eNB detects the preamble and transmits a random access response (RAR) on the downlink shared data channel. The response message includes: a random access preamble identification (ID), a timing advance (TA), a back-off indication, resource allocation and a Cell Radio Network Temporary Identifier (C-RNTI). The timing advance occupies 11 bits in the RAR and its value ranges from 0 to 1282. The UE implements uplink synchronization according to adjusted uplink transmission time.

The Long Term Evolution (LTE) uplink allows intra-cell orthogonality of the uplink. In one cell, uplink transmissions received from different terminals will not interfere with each other. The guarantee of the uplink orthogonality requires that arriving times of signals of different terminals transmitted in different frequency resources of the same sub-frame are substantially aligned. More precisely, any time misalignment of received signals should fall within a cyclic prefix. In order to ensure the time alignment at the receiver end, the LTE adopts a mechanism called timing advance. According to the above analysis, the cluster members within a certain range from the cluster head may implement uplink synchronization by using the TA information replied by the base station to the cluster head.

In S106, scheduling and transmission is performed.

The user sends an RRC competition request by using the resources allocated in S104. In addition, if multiple users select the same preamble and select the same random channel to send the preamble in S102, competition still exists in S106. The problem needs to be resolved in S108.

In S108, the competition is resolved.

If the eNB correctly obtains the RRC connection request message by demodulation, the eNB generates an RRC competition resolution message and sends it back to the UE. The UE uses the C-RNTI to receive a physical downlink control channel (PDCCH). At this time, all UEs facing transmission collisions can correctly obtain the PDCCH and receive the RRC competition resolution message according to an indication of the PDCCH, and then compare their own unique user identifiers with a user identifier in the RRC competition resolution message, and finally at most one UE matches the user identifier in the RRC competition resolution message, thereby resolving the collisions. The random access of the UE is successful, other UEs colliding with the UE need to perform a random access process again, and the UE with the successful random access uses the temporary C-RNTI as the formal C-RNTI.

In addition, FIG. 3 is a flowchart of a D2D one-to-one communication process in the related art. As shown in FIG. 3, after the cluster members complete the content download, each member establishes a D2D communication link with the cluster head and transmits the content to the cluster head. The process uses the existing D2D communications.

It can be seen that in the related art, when each of the cluster members in a cluster receives a download task, the cluster members need to separately perform a random access process, thereby increasing signaling overhead and the probability of collisions. However, in view of the above problem in the related art, no effective solution has yet been proposed.

SUMMARY

Embodiments of the present disclosure provide a random access method and apparatus to at least resolve the problem of separately executing a random access process by cluster members in a cluster when the cluster members establish connections with a base station in the related art.

According to an aspect of the embodiments of the present disclosure, a random access method is provided, including: selecting a preamble from a preset preamble set and transmitting the preamble to a base station by a first cluster head in a first cluster formed by a plurality of user equipments (UEs), where each preamble in the preamble set indicates a number of UEs corresponding to the each preamble and the number of UEs corresponding to the selected preamble is equal to a number of cluster members in the first cluster; receiving, by the first cluster head, a response message transmitted by the base station in response to the preamble, where the response message carries resource information that is used for establishing a radio resource control (RRC) connection and matches the number of cluster members in the first cluster and a Cell Radio Network Temporary Identifier (C-RNTI) corresponding to the number of cluster members in the first cluster; and broadcasting, by the first cluster head, the resource information that is used for establishing the RRC connection and the C-RNTI to each cluster member in the first cluster.

Optionally, the selecting, by the first cluster head in the first cluster formed by the plurality of UEs, the preamble from the preset preamble set includes: determining, by the first cluster head, the number of cluster members in the first cluster; and selecting, by the first cluster head, a preamble from the preset preamble set that matches the number of UEs in the first cluster as the preamble.

Optionally, the first cluster head determines the number of cluster members in the first cluster in a device to device (D2D) discovery manner.

Optionally, the response message further carries a timing advance (TA) and a back-off indication.

Optionally, before transmitting the preamble to the base station by the first cluster head, the method further includes the following step: when the first cluster head selects the preamble and a second cluster head in a second cluster formed by a plurality of UEs selects the preamble, winning the preamble by the first cluster head in a competition manner, where the number of cluster members in the first cluster is equal to the number of cluster members in the second cluster.

According to another aspect of the embodiments of the present disclosure, a random access method is provided, including: receiving, by a base station, a preamble transmitted by a first cluster head in a first cluster formed by a plurality of user equipments (UEs), where the preamble indicates a number of UEs corresponding to the preamble and the number of UEs corresponding to the preamble is equal to a number of cluster members in the first cluster; transmitting, by the base station, a response message to the first cluster head in response to the preamble, where the response message carries resource information that is used for establishing a radio resource control (RRC) connection and matches the number of cluster members in the first cluster and a Cell Radio Network Temporary Identifier (C-RNTI) corresponding to the number of cluster members in the first cluster; and establishing, by the base station, an RRC connection with cluster members in the first cluster according to the resource information and the C-RNTI, after the first cluster head broadcasts the resource information and the C-RNTI to the cluster members.

Optionally, the response message further carries a timing advance (TA) and a back-off indication.

According to still another aspect of the embodiments of the present disclosure, provided is a random access apparatus, applicable to a first cluster head in a first cluster formed by multiple user equipments (UEs), including: a processing module, configured to select a preamble from a preset preamble set and transmit the preamble to a base station, where each preamble in the preamble set indicates a number of UEs corresponding to the each preamble and the number of UEs corresponding to the selected preamble is equal to a number of cluster members in the first cluster; a first receiving module, configured to receive a response message transmitted by the base station in response to the preamble, where the response message carries resource information that is used for establishing a radio resource control (RRC) connection and matches the number of cluster members in the first cluster and a Cell Radio Network Temporary Identifier (C-RNTI) corresponding to the number of cluster members in the first cluster; and a broadcasting module, configured to broadcast the resource information that is used for establishing the RRC connection and the C-RNTI to each cluster member in the first cluster.

Optionally, the processing module includes: a determining unit, configured to determine the number of cluster members in the first cluster; and a selecting unit, configured to select a preamble from the preset preamble set that matches the number of UEs in the first cluster as the preamble.

Optionally, the determining unit is further configured to determine the number of cluster members in the first cluster in a device to device (D2D) discovery manner.

Optionally, the response message further carries a timing advance (TA) and a back-off indication.

Optionally, before the first cluster head sends the preamble to the base station, the apparatus further includes: a competition module, configured to win the preamble in a competition manner when the first cluster head selects the preamble and a second cluster head in a second cluster formed by a plurality of UEs selects the preamble, wherein the number of cluster members in the first cluster is equal to that in the second cluster.

According to still another aspect of the embodiments of the present disclosure, provided is a random access apparatus, applicable to a base station, including: a second receiving module, configured to receive a preamble transmitted by a first cluster head in a first cluster formed by a plurality of user equipments (UEs), where the preamble indicates a number of UEs corresponding to the preamble and the number of UEs corresponding to the preamble is equal to a number of cluster members in the first cluster; a response module, configured to transmit a response message to the first cluster head in response to the preamble, where the response message carries resource information that is used for establishing a radio resource control (RRC) connection and matches the number of cluster members in the first cluster and a Cell Radio Network Temporary Identifier (C-RNTI) corresponding to the number of cluster members in the first cluster; and an establishing module, configured to establish an RRC connection with cluster members in the first cluster according to the resource information and the C-RNTI, after the first cluster head broadcasts the resource information and the C-RNTI to the cluster members.

Optionally, the response message further carries a timing advance (TA) and a back-off indication.

The embodiments of the present disclosure further provide a computer storage medium, which is configured to store executable instructions for executing the random access methods according to the above embodiments.

According to the embodiments of the present disclosure, the preamble in the preset preamble set indicates the number of UEs corresponding to each preamble, and the number of UEs corresponding to the preamble selected by the first cluster head is the same as the number of cluster members in the cluster to which the first cluster head belongs. After the first cluster head sends the preamble, the first cluster head receives the response message sent by the base station in response to the resource information that is used for establishing a radio resource control (RRC) connection and that matches the number of cluster members in the first cluster as well as the Cell Radio Network Temporary Identifier (C-RNTI) corresponding to the number of cluster members in the first cluster; then the first cluster head broadcasts the resource information and the C-RNTI to the cluster members for establishing RRC connections. It can be seen that in the present disclosure, when the cluster members establish RRC connections with the base station, the cluster members do not need to sequentially establish connections with the base station in a competition manner and may simultaneously establish connections with the base station, thereby resolving the problem of separately executing a random access process by cluster members when the cluster members establish connections with a base station in the existing art and reducing system overhead.

BRIEF DESCRIPTION OF DRAWINGS

The accompanying drawings described herein are used to provide a further understanding of the present disclosure, and form a part of the present application. The exemplary embodiments and descriptions thereof in the present disclosure are used to explain the present disclosure and do not limit the present disclosure in any improper way. In the accompanying drawings.

DETAILED DESCRIPTION

The present disclosure will be described in detail with reference to the accompanying drawings in conjunction with the embodiments. It is to be noted that if not in conflict, the embodiments and features therein in the present application may be combined with each other.

It is to be noted that the terms "first", "second" and the like in the description, claims and above accompanying drawings of the present disclosure are used to distinguish between similar objects and are not necessarily used to describe a particular order or sequence.

Figure 1:
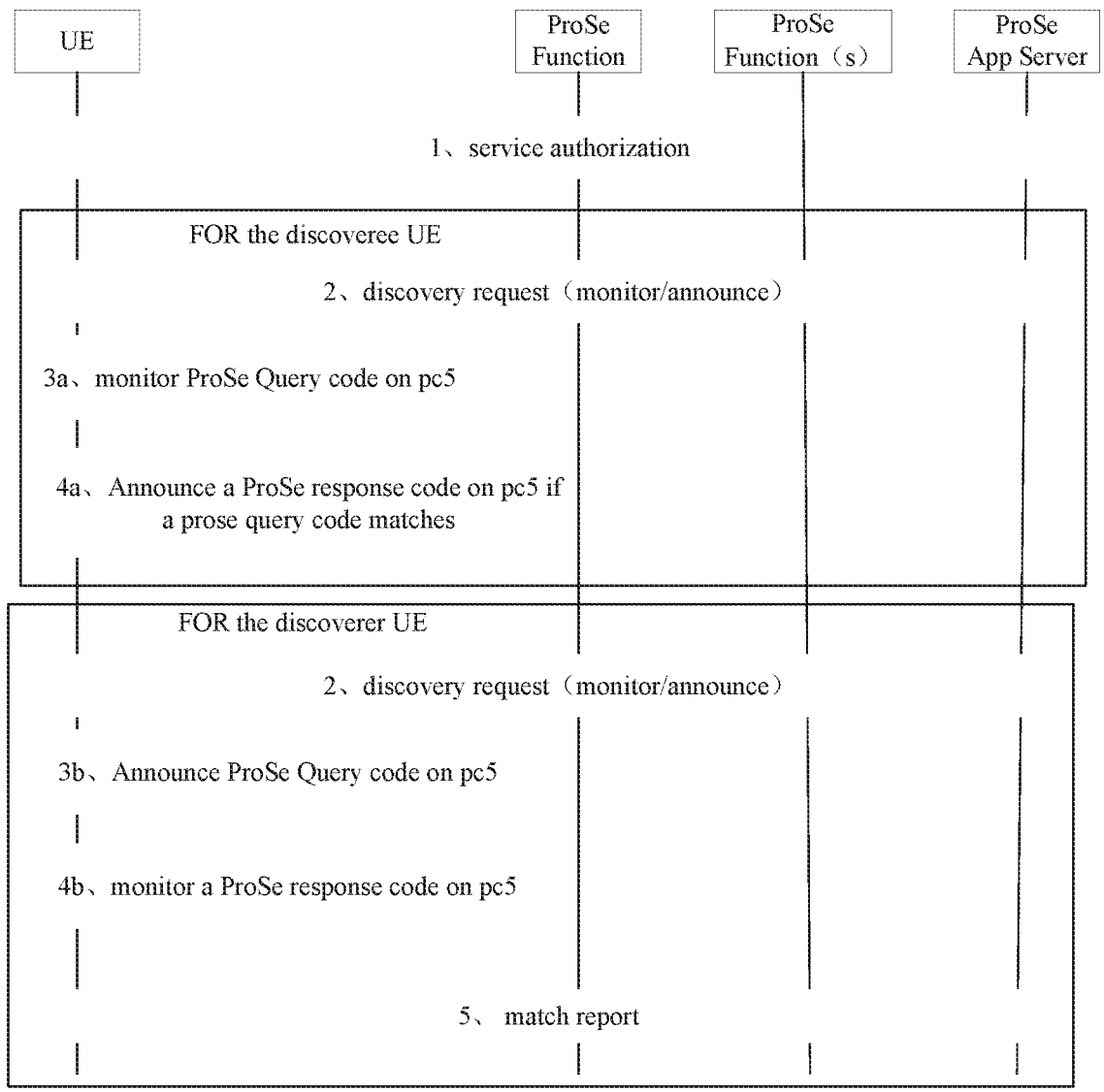
FIG. 1 is a flowchart of a D2D discovery process in the related art.
Figure 2:
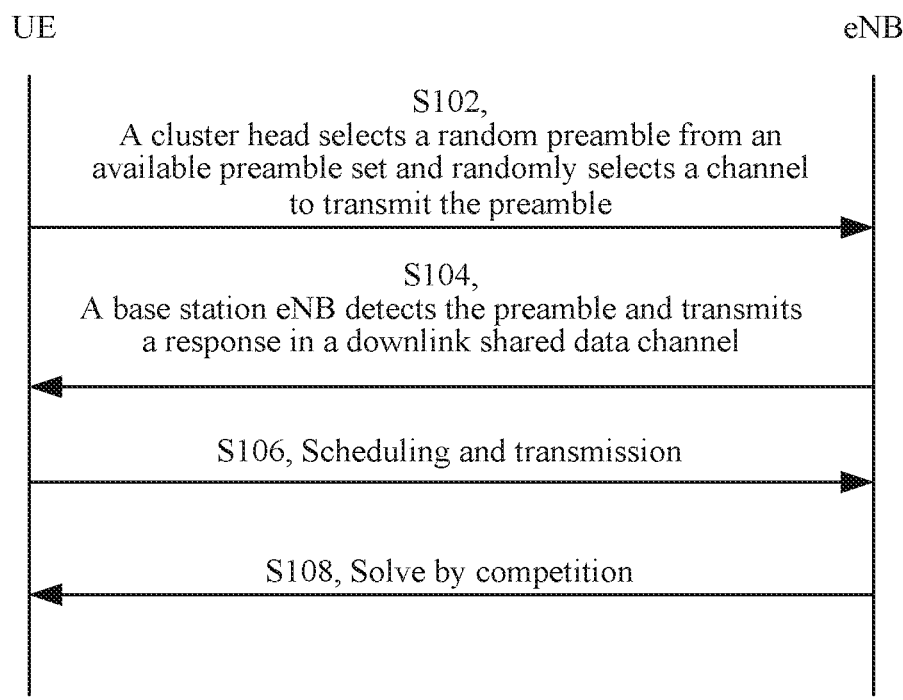
FIG. 2 is a schematic view of a random access channel (RACH) process in the related art.
Figure 3:
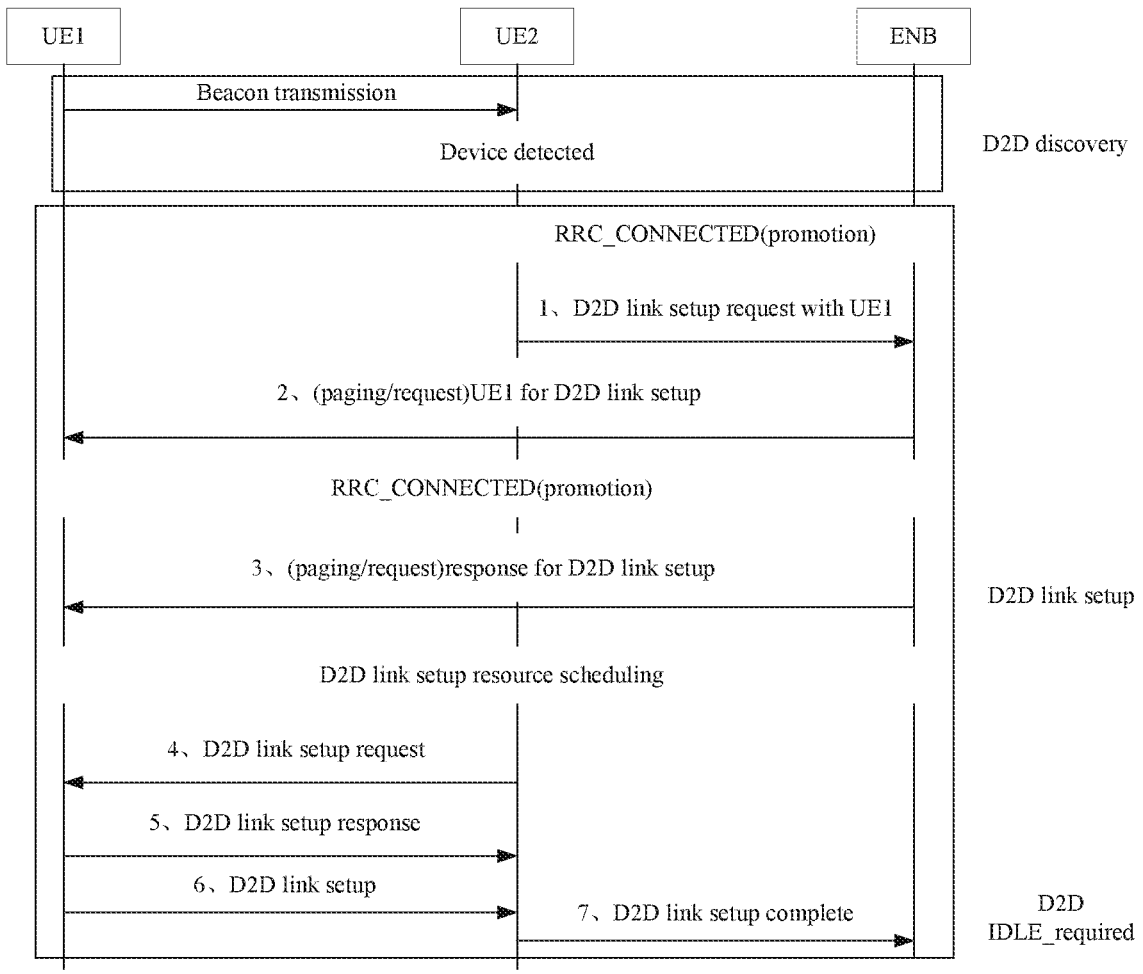
FIG. 3 is a flowchart of a D2D one-to-one communication process in the related art.
Figure 4:
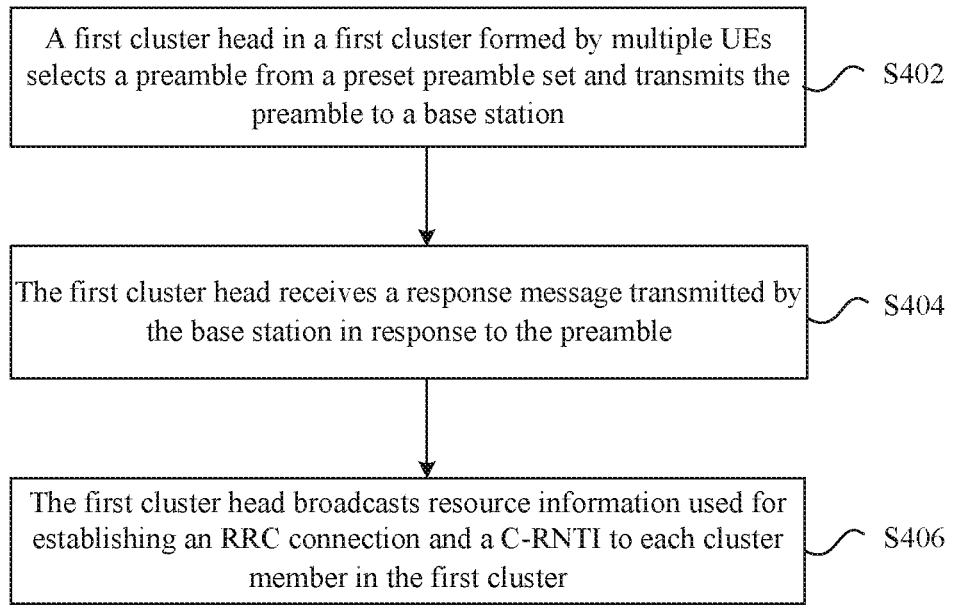
FIG. 4 is a flowchart 1 of a random access method according to an embodiment of the present disclosure.

The present embodiment provides a random access method. FIG. 4 is a flowchart 1 of a random access method according to an embodiment of the present disclosure. As shown in FIG. 4, the method includes the steps described below.

In S402, a first cluster head in a first cluster formed by multiple user equipments (UEs) selects a preamble from a preset preamble set and transmits the preamble to a base station, where each preamble in the preamble set indicates the number of UEs corresponding to the each preamble, and the number of UEs corresponding to the selected preamble is equal to the number of cluster members in the first cluster.

In S404, the first cluster head receives a response message transmitted by the base station in response to the preamble, where the response message carries resource information that is used for establishing a radio resource control (RRC) connection and matches the number of cluster members in the first cluster as well as a Cell Radio Network Temporary Identifier (C-RNTI) corresponding to the number of cluster members in the first cluster.

In S406, the first cluster head broadcasts the resource information used for establishing the RRC connection and the C-RNTI to each cluster member in the first cluster.

From the above S402, S404 and S406 in the present embodiment, it is known that each preamble in the preset preamble set indicates the number of UEs corresponding to the each preamble, and the number of UEs corresponding to the preamble selected by the first cluster head is equal to the number of cluster members in the cluster to which the first cluster head belongs. After the first cluster head transmits the preamble, the first cluster head receives the response message transmitted by the base station in response to the resource information that is used for establishing a radio resource control (RRC) connection and matches the number of cluster members in the first cluster as well as the Cell Radio Network Temporary Identifier (C-RNTI) corresponding to the number of cluster members in the first cluster, and then broadcasts the resource information and the C-RNTI to the cluster members for establishing RRC connections. It can be seen that in the present embodiment, when the cluster members establish RRC connections with the base station, the cluster members do not need to sequentially establish connections with the base station in a competition manner and may simultaneously establish connections with the base station, thereby resolving the problem in the related art that when the cluster members establish connections with the base station, the cluster members need to perform the random access process respectively and reducing system overhead.

In other words, in the present embodiment, a part of the preamble set is reserved for a cluster access and the number of cluster members represented by each preamble used for the cluster access is defined. The cluster head randomly selects one preamble corresponding to the number of cluster members from the preamble set for the random access process. After the base station detects the preamble, the base station may identify the size of the current cluster and thus allocate corresponding RRC access resources and temporary available C-RNTIs for the cluster.

It is to be noted that the response message involved in the present embodiment further carries a timing advance (TA) and a back-off indication.

In an alternative implementation of the present embodiment, the step involved in S402 in the present embodiment, in which the first cluster head in the first cluster formed by multiple UEs selects the preamble from the preset preamble set, may be implemented in the following manners.

In S402-1, the first cluster head determines the number of cluster members in the first cluster.

In an optional implementation mode of the present embodiment, the first cluster head determines the number of cluster members in the first cluster in a device to device (D2D) discovery manner.

In S402-2, the first cluster head selects a preamble from the preset preamble set that matches the number of UEs in the first cluster as the preamble.

It is known from S402-1 and S402-2 that the first cluster head firstly determines the number of cluster members in the cluster to which it belongs and then selects a preamble from the preset preamble set that matches the number of UEs in the first cluster as the preamble.

In another optional implementation mode of the present embodiment, before the first cluster head transmits the preamble to the base station, the method according to the present embodiment further includes: when the first cluster head selects the preamble and a second cluster head in a second cluster formed by multiple UEs selects the preamble, the first cluster obtains the preamble in a competition manner, where the number of cluster members in the first cluster is equal to that in the second cluster. That is to say, when two clusters of the same size transmit preambles on the same channel at the same time, the two clusters compete for the access and the cluster failing in the competition re-performs the RACH process in the manner in the related art.

Figure 5:
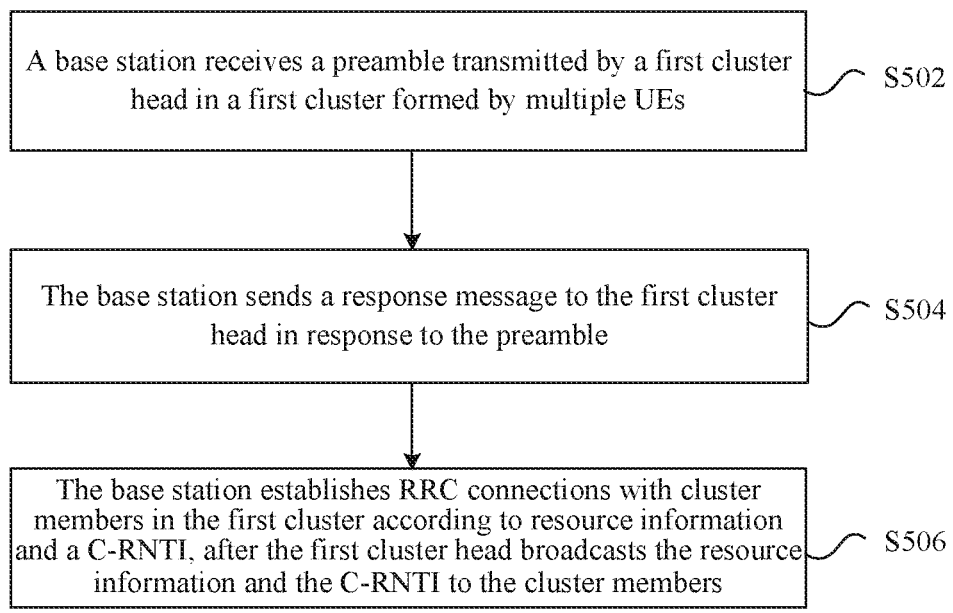
FIG. 5 is a flowchart 2 of a random access method according to an embodiment of the present disclosure.

FIG. 5 is a flowchart 2 of a random access method according to an embodiment of the present disclosure. As shown in FIG. 5, the method includes the steps described below.

In S502, a base station receives a preamble transmitted by a first cluster head in a first cluster formed by multiple UEs, where the preamble indicates a number of UEs corresponding to the preamble and the number of UEs is equal to a number of cluster members in the first cluster.

In S504, the base station transmits a response message to the first cluster head in response to the preamble, where the response message carries resource information that is used for establishing a radio resource control (RRC) connection and matches the number of cluster members in the first cluster as well as a Cell Radio Network Temporary Identifier (C-RNTI) corresponding to the number of cluster members in the first cluster.

In S506, the base station establishes an RRC connection with cluster members in the first cluster according to the resource information and the C-RNTI, after the first cluster head broadcasts the resource information and the C-RNTI to the cluster members.

Optionally, the response message further carries a timing advance (TA) and a back-off indication.

It can be seen that after the base station receives the preamble transmitted by the first cluster head, the base station transmits, according to the preamble, the resource information that is used for establishing the radio resource control (RRC) connection and matches the number of cluster members in the first cluster as well as the Cell Radio Network Temporary Identifier (C-RNTI) corresponding to the number of cluster members in the first cluster to the first cluster head, thereby enabling cluster members to establish connections with the base station simultaneously. Compared with the manner in the related art, the cluster members do not need to separately establish connections with the base station.

From the description of the embodiments described above, it will be apparent to those skilled in the art that the method of any embodiment described above may be implemented by means of software plus a necessary general-purpose hardware platform, or may of course be implemented by hardware, but in many cases, the former is a preferred implementation mode. Based on this understanding, the solution provided by the present disclosure substantially, or the part contributing to the existing art, may be embodied in the form of a software product. The computer software product is stored in a storage medium (such as a ROM/RAM, a magnetic disk or an optical disk) and includes several instructions for enabling a terminal device (which may be a mobile phone, a computer, a server, a network device, or the like) to execute the method according to each embodiment of the present disclosure.

Embodiments of the present disclosure further provide a random access apparatus for implementing the above-mentioned embodiments and preferred embodiments. What has been described will not be repeated. As used below, a term "module" may be software, hardware or a combination thereof capable of implementing preset functions. The apparatus in the embodiment described below is preferably implemented by software, but implementation by hardware or by a combination of software and hardware is also possible and conceived.

Figure 6:
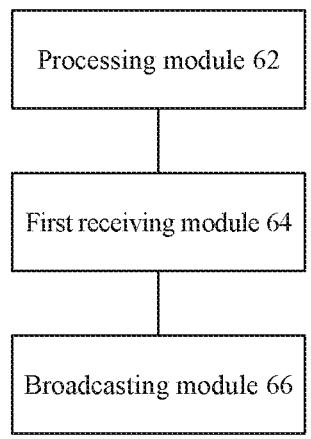
FIG. 6 is a block diagram 1 of a random access apparatus according to an embodiment of the present disclosure.

FIG. 6 is a block diagram 1 of a random access apparatus according to embodiments of the present disclosure. The apparatus is applicable to a first cluster head in a first cluster formed by multiple user equipments (UEs). As shown in FIG. 6, the apparatus includes: a processing module 62 configured to select a preamble from a preset preamble set and transmit the preamble to a base station, where each preamble in the preamble set indicates a number of UEs corresponding to each preamble and the number of UEs corresponding to the selected preamble is the same as a number of cluster members in the first cluster; a first receiving module 64, coupled with the processing module 62 and configured to receive a response message transmitted by the base station in response to the preamble, where the response message carries resource information that is used for establishing a radio resource control (RRC) connection and matches the number of cluster members in the first cluster as well as a Cell Radio Network Temporary Identifier (C-RNTI) corresponding to the number of cluster members in the first cluster; and a broadcasting module 66, coupled with the first receiving module 64 and configured to broadcast the resource information that is used for establishing the RRC connection and the C-RNTI to each cluster member in the first cluster.

Optionally, the processing module 62 includes: a determining unit, configured to determine the number of cluster members in the first cluster; and a selecting unit, coupled with the determining unit and configured to select a preamble from the preset preamble set that matches the number of UEs in the first cluster as the preamble. In an optional implementation mode of the present embodiment, the determining unit is further configured to determine the number of cluster members in the first cluster in a device to device (D2D) discovery manner.

Optionally, the response message further carries a timing advance (TA) and a back-off indication.

Optionally, before the first cluster head sends the preamble to the base station, the apparatus according to the present embodiment further includes: a competition module, configured to obtain the preamble in a competition manner when the first cluster head selects the preamble and a second cluster head in a second cluster formed by multiple UEs selects the preamble, where the number of cluster members in the first cluster is equal to that in the second cluster.

Figure 7:
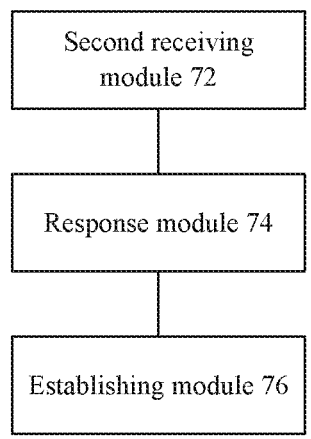
FIG. 7 is a block diagram 2 of a random access apparatus according to an embodiment of the present disclosure.

FIG. 7 is a block diagram 2 of a random access apparatus according to an embodiment of the present disclosure. The apparatus is applicable to a base station. As shown in FIG. 7, the apparatus includes: a second receiving module 72, configured to receive a preamble transmitted by a first cluster head in a first cluster formed by multiple UEs, where the preamble indicates a number of UEs corresponding to the preamble and the number of UEs is the same as the number of cluster members in the first cluster; a response module 74, coupled with the second receiving module 72 and configured to transmit a response message to the first cluster head in response to the preamble, where the response message carries resource information that is used for establishing a radio resource control (RRC) connection and matches the number of cluster members in the first cluster as well as a Cell Radio Network Temporary Identifier (C-RNTI) corresponding to the number of cluster members in the first cluster; and an establishing module 76, coupled with the response module 74 and configured to establish an RRC connection with cluster members in the first cluster according to the resource information and the C-RNTI, after the first cluster head broadcasts the resource information and the C-RNTI to the cluster members.

Optionally, the response message involved in the present embodiment further carries a timing advance (TA) and a back-off indication.

The various modules described above may be implemented by software or hardware. Implementation by hardware may, but may not necessarily, be realized in the following manner. The various modules described above are located in a same processor or located in multiple processors respectively.

The present disclosure will be illustrated below in conjunction with an optional embodiment of the present disclosure.

The present optional embodiment provides a method for a cluster-based random access process and the main technical solution of the method includes: reserving a part of the original preamble set for cluster accessing and defining the number of cluster members represented by the preamble used for the cluster accessing. The cluster head randomly selects one preamble corresponding to the number of cluster members in the set for executing a random access process. After the base station detects the preamble, the base station may identify the size of the current cluster and thus allocate corresponding RRC access resources and temporary available C-RNTIs for the cluster. For example, when the cluster includes two nodes, the base station need to allocate RRC resources required for the two nodes to access the base station.

Figure 8:
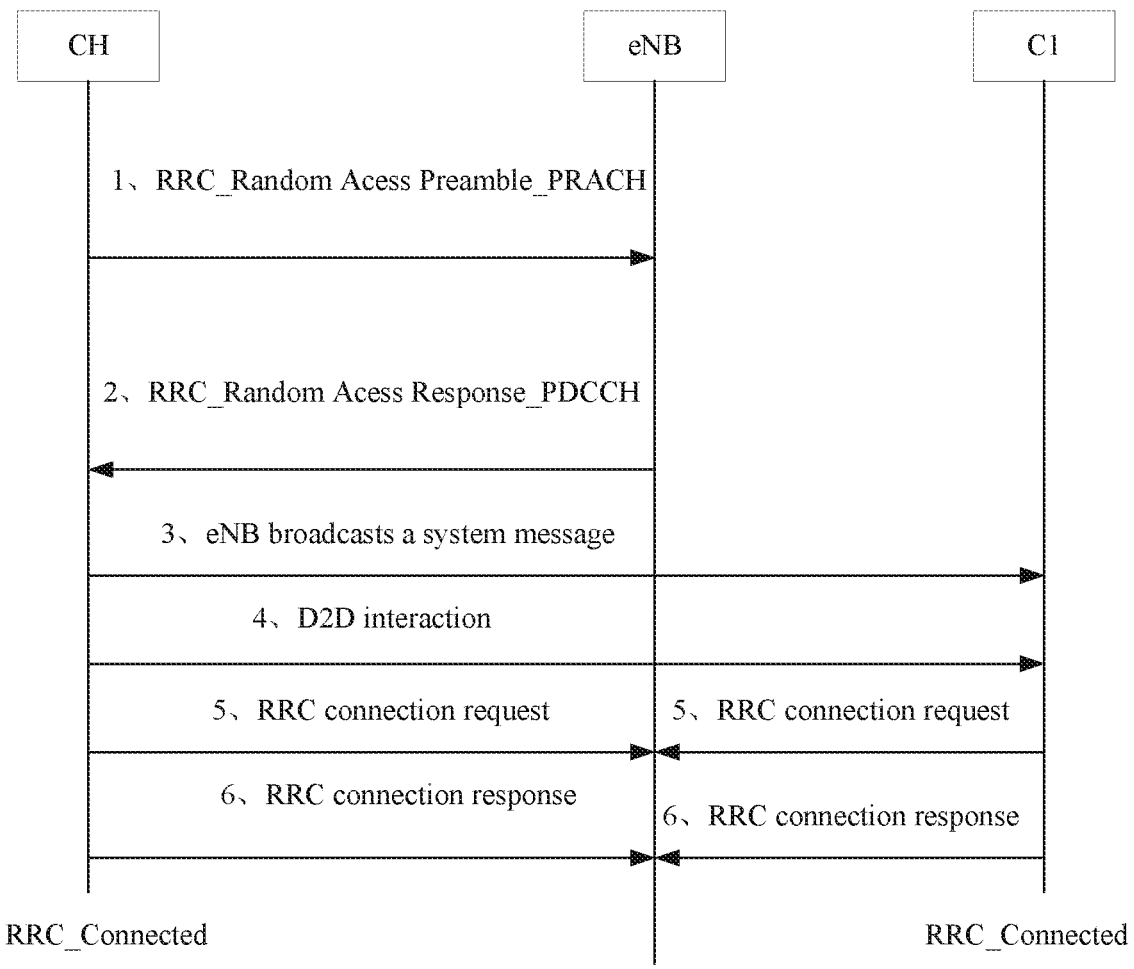
FIG. 8 is a flowchart of a cluster-based random access process according to an optional embodiment of the present disclosure.

The process according to the present optional embodiment will be described below in detail with reference to the accompanying drawings. FIG. 8 is a flowchart of a cluster-based random access process according to an optional embodiment of the present disclosure. As shown in FIG. 8, the method includes the steps described below.

In S802, a cluster head determines the number N of cluster members by a D2D discovery process.

In S804, the cluster head selects a default preamble (specifying the number N of cluster members) from a reserved preamble set and randomly selects a channel to transmit the preamble.

In S806, a base station, eNB, detects the preamble and transmits a response message in a physical downlink control channel (PDCCH), where the response message includes: a random access preamble identification (ID), a timing advance (TA), a back-off indication, resource information for RRC connection request usable by the cluster and N temporary C-RNTIs. The resource is allocated by the base station according to the size of the cluster, to ensure that each cluster member in the cluster can establish an RRC connection with the base station.

In S808, the current cluster head and cluster members are all in an RRC_IDLE state because the cluster is to access the base station, the base station configures the commTxPoolNormalCommo information in the SystemInformationBlockType18 information to indicate certain D2D broadcast communication resources, and the base station broadcasts this information to the cluster head and the cluster members.

In S810, the cluster head uses resources specified by commTxPoolNormalCommon to broadcast a message to the cluster members, where this resources include RRC resources, a temporary C-RNTI, and a timing advance allocated for each member. The cluster members monitor resources specified by commTxPoolNormalCommon.

In S812, after the cluster members receive the message broadcasted by the cluster head, the cluster members use the allocated resources and temporary C-RNTIs to execute a RRC connection establishment process.

In S814, if the eNB obtains an RRC_Connection establishment request successfully, the eNB replies an RRC establishment response to the cluster and the cluster members.

It is to be noted that if two clusters of the same size in the same cell transmit preambles on the same channel at the same time, the two clusters will collide with each other and the collision is resolved in a competition manner. The cluster which wins in the competition for accessing the base station performs the random access in the manner in the existing art and the cluster facing which fails in the competition for accessing the base station re-performs the RACH process in the manner mentioned in the background.

Figure 9:
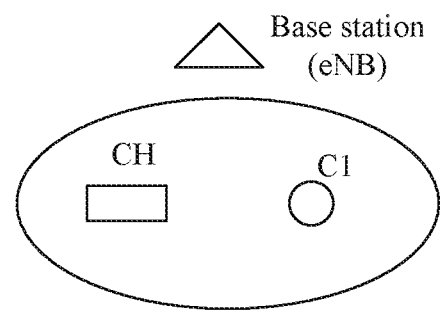
FIG. 9 is a schematic view of a cluster-based random access process according to an optional embodiment of the present disclosure.

In an application scenario of the present optional embodiment, it is assumed that, in a cell, the cluster head (CH) needs to download content. Considering the size of the content, the cluster head searches for a suitable cluster member through the Model B of the D2D discovery process. In this example, assuming that only one cluster member C1 is required, the size of the cluster indicated by the preamble P1 in the reserved preamble set is 2. FIG. 9 is a schematic view of a cluster-based random access process according to an optional embodiment of the present disclosure. As shown in FIG. 9, the random access process includes the steps described below.

In S902, the CH randomly selects a channel to transmit a default preamble P1 and starts a RACH process.

If an eNB successfully detects the preamble P1, the eNB replies corresponding information to the CH: ID of the preamble P1, a timing advance, a back-off indication, uplink resources RB1 and a temporary C-RNTI_1 for the CH, uplink resources RB2 and a temporary C-RNTI_2 for the C1.

In S904, the cluster head and the cluster member are both in an RRC_IDLE state, the base station configures commTxPoolNormalCommo information in the SystemInformationBlockType18 information, which indicates certain D2D broadcast communication resources, and the base station broadcasts the commTxPoolNormalCommo information to the cluster head and the cluster member.

In S906, the CH uses resources specified by commTxPoolNormalCommon information to inform the C1 of the uplink resources RB2 and the temporary C-RNTI_2.

In S908, the CH uses the C-RNTI_1 to transmit an RRC_Connection_Request message on the resources RB1. If the eNB successfully detects the request message, the eNB replies a response to the CH and the C-RNTI_1 becomes a formal identifier of the CH.

The C1 uses the C-RNTI_2 to transmit an RRC_Connection_Request message on the resources RB2. If the eNB successfully detects the request message, the eNB replies a response to the C1 and the C-RNTL_2 becomes a formal identifier of the C1.

In S910, the cluster head and the cluster member are switched from the RRC_IDLE state to an RRC_Connected state and receive downlink data.

It is known from the solution in the present optional embodiment that the cluster-based random access process can reduce overhead and improve content download efficiency, thereby resolving the following problems in the related art: each cluster member in the cluster separately executes the random access process, several times of competition cause increased system overhead, and the signaling overhead of the system is large.

The embodiments of the present disclosure further provide a storage medium. Optionally, in the present embodiment, the storage medium described above may be configured to store program codes for executing the steps described below.

In S1, a first cluster head in a first cluster formed by multiple user equipments (UEs) selects a preamble from a preset preamble set and transmits the preamble to a base station, where each preamble in the preamble set indicates a number of UEs corresponding to each preamble and the number of UEs corresponding to the selected preamble is the same as a number of cluster members in the first cluster.

In S2, the first cluster head receives a response message transmitted by the base station in response to the preamble, where the response message carries resource information that is used for establishing a radio resource control (RRC) connection and matches the number of cluster members in the first cluster as well as a Cell Radio Network Temporary Identifier (C-RNTI) corresponding to the number of cluster members in the first cluster.

In S3, the first cluster head broadcasts the resource information that is used for establishing the RRC connection as well as the C-RNTI to each cluster member in the first cluster. Optionally, for specific examples in the present embodiment, reference may be made to the examples described in the above embodiments and optional implementation modes, and repetition will not be made in the present embodiment.

Apparently, those skilled in the art should know that each of the above-mentioned modules or steps of the present disclosure may be implemented by a universal computing device, the modules or steps may be concentrated on a single computing device or distributed on a network formed by multiple computing devices, and alternatively, the modules or steps may be implemented by program codes executable by the computing devices, so that modules or steps may be stored in a storage device and executable by the computing devices. In some circumstances, the illustrated or described steps may be executed in sequences different from those described herein, or the illustrated or described steps may be made into various integrated circuit modules separately, or multiple modules or steps therein may be made into a single integrated circuit module for implementation. In this way, the present disclosure is not limited to any specific combination of hardware and software.

The above are only preferred embodiments of the present disclosure and are not intended to limit the present disclosure, and for those skilled in the art, the present disclosure may have various modifications and variations. Any modifications, equivalent substitutions, improvements and the like made within the spirit and principle of the present disclosure are within the scope of the present disclosure.

INDUSTRIAL APPLICABILITY

In the random access process according to the embodiments of the present disclosure, the preamble in the preset preamble set indicates the number of UEs corresponding to each preamble, and the number of UEs corresponding to the preamble selected by the first cluster head is the same as the number of cluster members in the cluster to which the first cluster head belongs. After the first cluster head transmits the preamble, the first cluster head receives the response message transmitted by the base station in response to the preamble. The response message carries resource information that is used for establishing a radio resource control (RRC) connection and matches the number of cluster members in the first cluster as well as the Cell Radio Network Temporary Identifier (C-RNTI) corresponding to the number of cluster members in the first cluster. Then, the first cluster head broadcasts the resource information and the C-RNTI to the cluster members for establishing RRC connections. It can be seen that in the present disclosure, when the cluster members establish RRC connections with the base station, the cluster members do not need to sequentially establish connections with the base station in a competition manner and may simultaneously establish connections with the base station, so that resolved is the problem in the related art that when the cluster members establish connections with the base station, the cluster members need to perform the random access process respectively, thereby reducing system overhead.

What is claimed is:

1. A random access method, comprising:
   selecting a preamble from a preset preamble set and transmitting the preamble to a base station by a first cluster head in a first cluster formed by a plurality of user equipment (UEs), wherein each preamble in the preamble set indicates a number of UEs corresponding to the each preamble and the number of UEs corresponding to the selected preamble is equal to a number of cluster members in the first cluster;
   receiving, by the first cluster head, a response message transmitted by the base station in response to the preamble, wherein the response message carries resource information that is used for establishing a radio resource control (RRC) connection and matches the number of cluster members in the first cluster and a Cell Radio Network Temporary Identifier (C-RNTI) corresponding to the number of cluster members in the first cluster; and
   broadcasting, by the first cluster head, the resource information that is used for establishing the RRC connection and the C-RNTI to each cluster member in the first cluster.

2. The method according to claim 1, wherein the selecting, by the first cluster head in the first cluster formed by the plurality of UEs, the preamble from the preset preamble set comprises:
   determining, by the first cluster head, the number of cluster members in the first cluster; and
   selecting, by the first cluster head, a preamble from the preset preamble set that matches the number of UEs in the first cluster as the preamble.

3. The method according to claim 2, wherein the first cluster head determines the number of cluster members in the first cluster in a device to device (D2D) discovery manner.

4. The method according to claim 3, wherein the response message further carries a timing advance and a back-off indication.

5. The method according to claim 2, wherein the response message further carries a timing advance and a back-off indication.

6. The method according to claim 1, wherein the response message further carries a timing advance (TA) and a back-off indication.

7. The method according to claim 1, before transmitting the preamble to the base station by the first cluster head, the method further comprising:
when the first cluster head selects the preamble and a second cluster head in a second cluster formed by a plurality of UEs selects the preamble, winning the preamble by the first cluster head in a competition manner, wherein the number of cluster members in the first cluster is equal to the number of cluster members in the second cluster.

8. A random access method, comprising:
receiving, by a base station, a preamble transmitted by a first cluster head in a first cluster formed by a plurality of user equipment (UEs), wherein the preamble indicates a number of UEs corresponding to the preamble and the number of UEs corresponding to the preamble is equal to a number of cluster members in the first cluster;
transmitting, by the base station, a response message to the first cluster head in response to the preamble, wherein the response message carries resource information that is used for establishing a radio resource control (RRC) connection and matches the number of cluster members in the first cluster and a Cell Radio Network Temporary Identifier (C-RNTI) corresponding to the number of cluster members in the first cluster; and
establishing, by the base station, an RRC connection with cluster members in the first cluster according to the resource information and the C-RNTI, after the first cluster head broadcasts the resource information and the C-RNTI to the cluster members.

9. The method according to claim 8, wherein the response message further carries a timing advance (TA) and a back-off indication.

10. A non-transitory computer-readable storage medium storing executable instructions that, when executed by an electronic device, cause the electronic device to perform a random access method,
wherein the random access method comprises:
selecting a preamble from a preset preamble set and transmitting the preamble to a base station by a first cluster head in a first cluster formed by a plurality of UEs, wherein each preamble in the preamble set indicates a number of UEs corresponding to the each preamble and the number of UEs corresponding to the selected preamble is equal to a number of cluster members in the first cluster;
receiving, by the first cluster head, a response message transmitted by the base station in response to the preamble, wherein the response message carries resource information that is used for establishing a RRC connection and matches the number of cluster members in the first cluster and a C-RNTI corresponding to the number of cluster members in the first cluster; and
broadcasting, by the first cluster head, the resource information that is used for establishing the RRC connection and the C-RNTI to each cluster member in the first cluster.

11. The non-transitory computer-readable storage medium according to claim 10, wherein the selecting, by the first cluster head in the first cluster formed by the plurality of UEs, the preamble from the preset preamble set comprises:
determining, by the first cluster head, the number of cluster members in the first cluster; and
selecting, by the first cluster head, a preamble from the preset preamble set that matches the number of UEs in the first cluster as the preamble.

12. The non-transitory computer-readable storage medium according to claim 11, wherein the first cluster head determines the number of cluster members in the first cluster in a D2D discovery manner.

13. The non-transitory computer-readable storage medium according to claim 12, wherein the response message further carries a timing advance and a back-off indication.

14. The non-transitory computer-readable storage medium according to claim 11, wherein the response message further carries a timing advance and a back-off indication.

15. The non-transitory computer-readable storage medium according to claim 10, wherein the response message further carries a timing advance and a back-off indication.

16. The non-transitory computer-readable storage medium according to claim 10, before transmitting the preamble to the base station by the first cluster head, the method further comprising:
when the first cluster head selects the preamble and a second cluster head in a second cluster formed by a plurality of UEs selects the preamble, winning the preamble by the first cluster head in a competition manner, wherein the number of cluster members in the first cluster is equal to the number of cluster members in the second cluster.

* * * * *